United States Patent

Mouterde et al.

[11] Patent Number: 5,558,384
[45] Date of Patent: Sep. 24, 1996

[54] MOTORIZED BREAKDOWN VEHICLE

[75] Inventors: Renaud Mouterde, Versailles; Jacky Jacquemont, Clamart; Michel Lamarche, Ver-les-Chartres, all of France

[73] Assignee: Giat Industries, Versailles, France

[21] Appl. No.: 284,036

[22] Filed: Aug. 1, 1994

[30] Foreign Application Priority Data

Aug. 4, 1993 [FR] France ................................. 93 09603

[51] Int. Cl.$^6$ ................................. B60R 5/00; F41H 7/02
[52] U.S. Cl. ................................. 296/37.1; 89/40.07
[58] Field of Search ................................. 296/37.1, 37.5, 296/37.6; 89/36.08, 40.07

[56] References Cited

U.S. PATENT DOCUMENTS

| | | | |
|---|---|---|---|
| 2,339,334 | 1/1944 | Heaslet | 89/40.07 X |
| 2,978,153 | 4/1961 | Brindle | 296/37.6 X |
| 3,406,999 | 10/1968 | Kozicki | 296/37.1 X |
| 4,158,986 | 6/1979 | Appelblatt et al. | 89/36.08 |
| 4,236,441 | 12/1980 | Turner et al. | 89/40.07 |
| 4,423,980 | 1/1984 | Warnock | 296/37.6 X |
| 4,648,305 | 3/1987 | Elspass | 89/40.07 X |
| 4,737,055 | 4/1988 | Scully | 89/40.07 X |
| 4,796,721 | 1/1989 | Knapp et al. | 89/36.08 X |
| 4,830,421 | 5/1989 | Hawelka et al. | 296/37.6 X |
| 4,848,498 | 7/1989 | Hart et al. | 296/37.5 X |
| 5,113,719 | 5/1992 | Amrein et al. | 89/360.08 X |

FOREIGN PATENT DOCUMENTS

| | | |
|---|---|---|
| 0001370A1 | 4/1979 | European Pat. Off. . |
| 2841902 | 7/1979 | Germany . |
| 2937813 | 4/1981 | Germany . |
| 7147135 | 11/1983 | Germany . |
| 1461716 | 1/1977 | United Kingdom . |
| 2206853 | 1/1989 | United Kingdom . |

*Primary Examiner*—Joseph D. Pape
*Attorney, Agent, or Firm*—Herbert Dubno

[57] ABSTRACT

A motorized breakdown vehicle, in particular for a tank, which vehicle includes a chassis and a removable platform mounted directly on the chassis. The platform can be organized so as to support equipment required for maintenance and/or repair operations, such equipment including, in particular, stowage lockers. In a preferred embodiment, the chassis is a tank chassis, and the platform is mounted on the rear portion of the chassis.

11 Claims, 4 Drawing Sheets

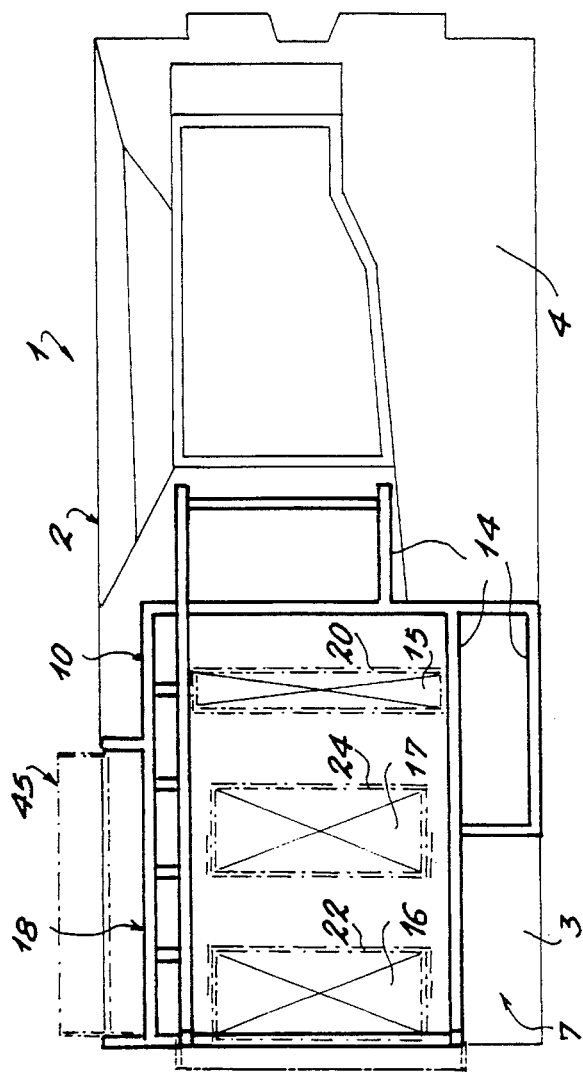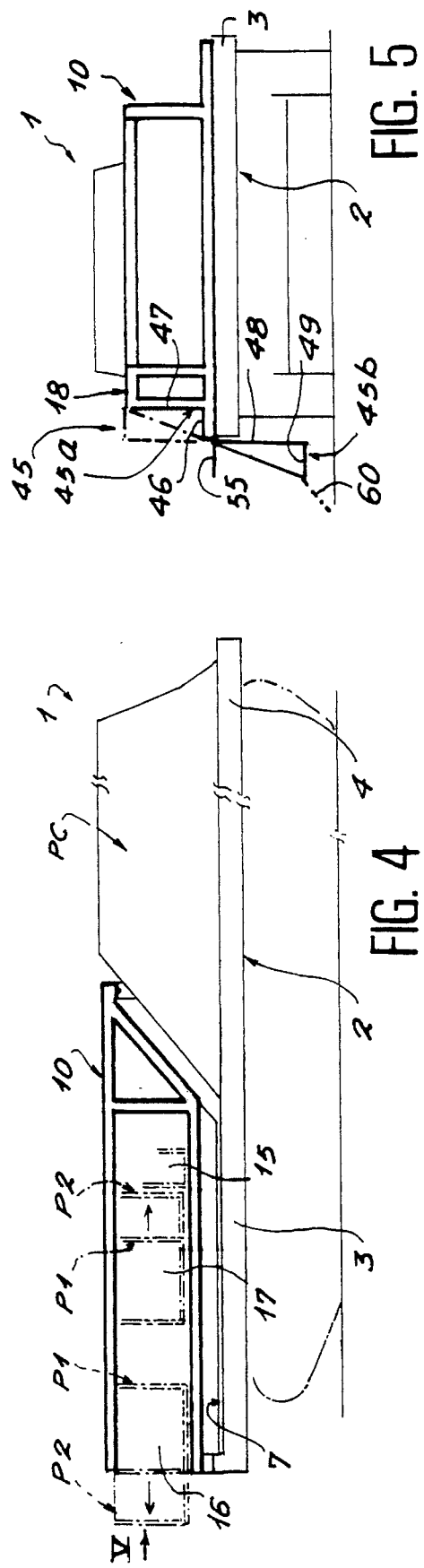

MOTORIZED BREAKDOWN VEHICLE

The invention relates to a motorized breakdown vehicle, organized in particular for performing preventive maintenance and/or repairs, e.g. on a tank.

BACKGROUND OF THE INVENTION

In combat or on maneuvers, a tank generally travels under conditions which are very tough, in particular when the terrain is uneven, stoney, and/or sandy, and when climatic conditions that are not necessarily clement are also encountered. Despite the reliability of such vehicles, and of the associated equipment, breakdowns are always possible, some of which immobilize the tank, breakdowns in the engine, in the transmission systems, or in the tracks, etc. Naturally, in addition to such accidental breakdowns, when the tank is in combat, it might suffer breakdowns resulting from damage caused by an antitank weapon or by a mine exploding, for example.

When a tank is immobilized, a first repair operation may be performed in situ by using certain on-board tools. However, there are limits to what can be done with such tools, and it might be impossible to repair the tank, in particular through lack of spare parts. A second repair operation may be performed in situ by using a breakdown vehicle which is capable of carrying larger items of equipment, e.g. spare parts, but this considerably increases the repair time. A third repair operation may be performed by using a transporter vehicle for removing the tank, but it must be possible for such a vehicle to reach the zone in which the tank is immobilized.

Overall, there are plenty of possibilities for repairing a tank, but they are disparate, and they often take a long time to implement, which decreases their effectiveness.

OBJECT OF THE INVENTION

An object of the invention is to mitigate those drawbacks, and to provide a motorized breakdown vehicle which offers increased effectiveness, by having a structure and fittings that are better suited to the vehicles on which it is to perform maintenance and/or repair, and by taking account of requests made by users.

SUMMARY OF THE INVENTION

To this end, the invention provides a motorized breakdown vehicle in particular for a tank, wherein said vehicle includes a chassis on which a removable platform of modular design is mounted, the platform including supports receiving equipment required for performing maintenance, repair, and/or supply operations, and at least some of the supports being displaceable on the platform so as to provide access to different portions of the engine of the vehicle.

A certain number of advantages are offered by the vehicle of the invention:

- the supports of the platform can receive various items of equipment, adapted to the maintenance or repair operations to be performed;
- the displaceable supports enable access to be provided to the engine of the vehicle without it being necessary to unload the items of equipment mounted on the supports;
- the removability of the platform enables major maintenance and repair work to be performed on the breakdown vehicle, e.g. changing the engine; and loading, transporting, and using the on-board equipment of the breakdown vehicle are improved.

According to another feature of the invention, such equipment may include lockers for stowing tools and spare parts, some of the lockers being supported by rigid frames integrated in the platform, while other stowage lockers are supported by rigid frames that are hinged to the platform.

According to another feature of the invention, on one side of the chassis, the platform may be provided with a stowage locker having a drop-down portion that can be dropped down groundwards along the chassis, the drop-down portion being equipped in particular with a movable ladder and a pivoting walkway.

According to another feature of the invention, the platform may include at least one first zone which is capable of supporting a handling apparatus, such as a hoisting crane, and a second zone for supporting relatively bulky spare parts, such as an engine or a mechanism housing (gear box).

In a preferred embodiment of the invention, the chassis of the breakdown vehicle is a tank chassis having a rear portion in which the engine of the breakdown vehicle is received, and a front portion in which a driving and control cab is provided, the removable platform being mounted directly on the rear portion of the chassis, and above the engine.

In a tank, the engine and the chassis which receives it are designed so that direct access is provided to a set of elements or accessories of the engine, such as for example the air filter, the oil filter, the condenser, and the battery, etc. so that maintenance operations can be performed easily.

That is why some of the stowage lockers supported by the platform are hinged so as to be capable of taking up respective transport positions and respective maintenance and/or repair positions, in which the above-mentioned access points are unobstructed. In this way, the breakdown vehicle enables maximum use to made of the rear deck of the vehicle, while making it possible to overcome the constraints imposed so that maintenance can be performed on the engine of the breakdown vehicle.

BRIEF DESCRIPTION OF THE DRAWINGS

Other advantages, features and details of the invention will appear on reading the following explanatory description given solely by way of example and with reference to the accompanying drawing, in which:

FIG. 3 is a diagrammatic plan view of the breakdown vehicle equipped with its platform;

FIG. 4 is a side view of the vehicle of FIG. 3;

FIG. 5 is a diagrammatic view in the direction of arrow V of FIG. 4;

SPECIFIC DESCRIPTION

In the figures, a motorized breakdown vehicle of the invention includes a chassis 2 which supports all the elements required for propelling and for controlling the vehicle, and all the elements required for performing repair, maintenance, and/or supply operations.

Figure 1:
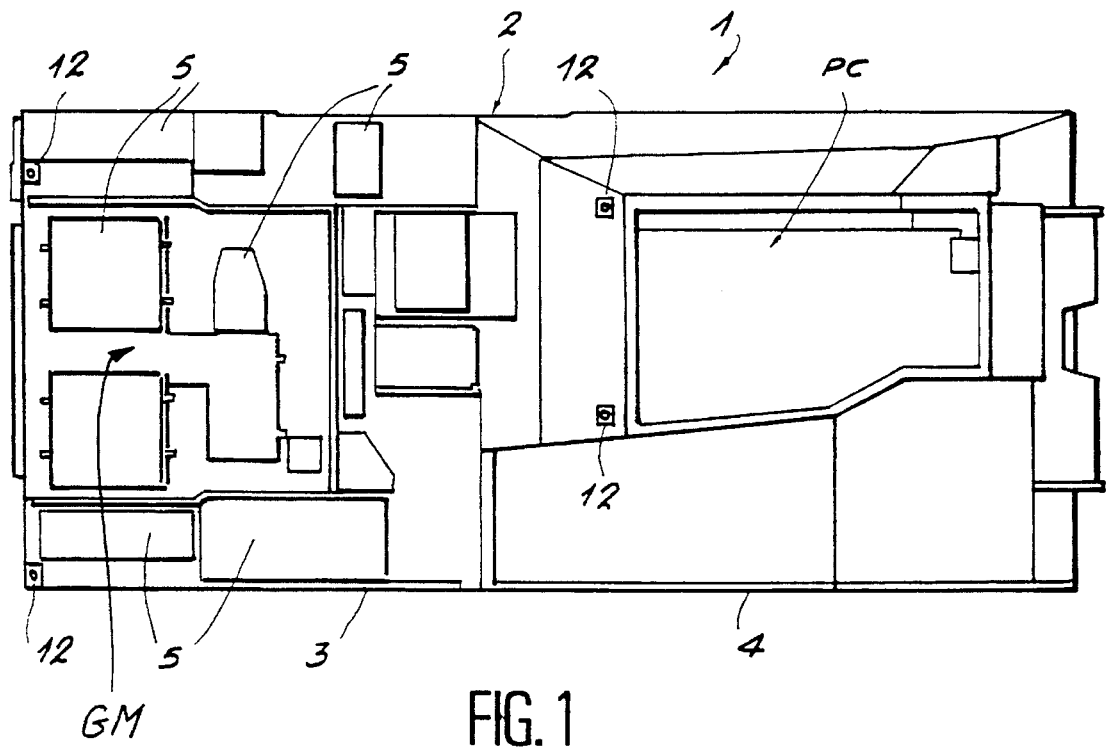
FIG. 1 is a diagrammatic plan view of the chassis of a breakdown vehicle of the invention.

The chassis 2, as shown in the plan view of FIG. 1, comprises a rear portion 3 and a front portion 4.

The vehicle 1 is equipped with an engine GM which is received in the rear chassis portion 3, and a driving and control cab PC which is provided in the front chassis portion 4.

Reference numeral 5 designates a set of elements or accessories of the engine GM, such as for example the air filter, the oil filter, the condenser, the fan, and the battery, etc., these elements being accessible from the rear deck 7 of the chassis 3. Such a layout corresponds substantially to that of the chassis and the engine of a tank.

Figure 2:
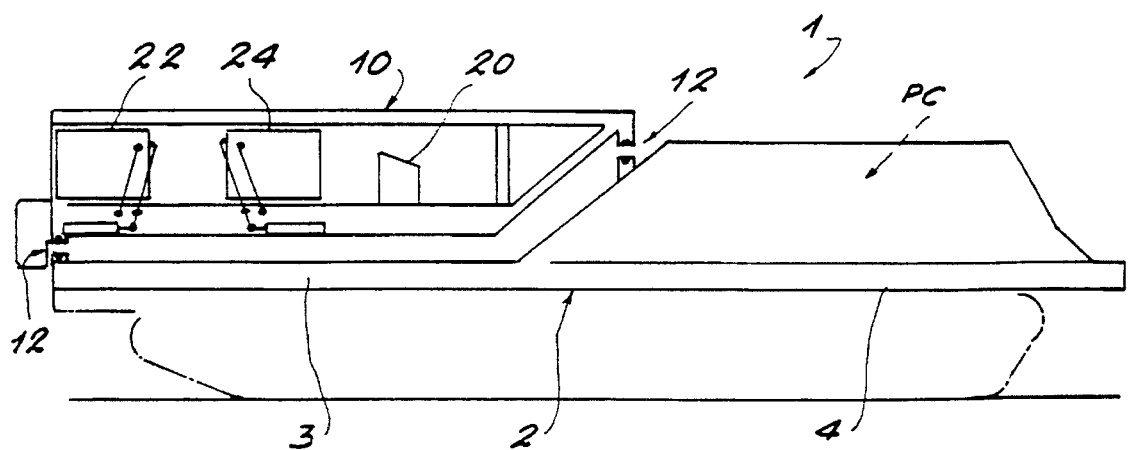
FIG. 2 is a side view of the breakdown vehicle, showing how a platform is mounted on the chassis.

The vehicle 1 is equipped with a removable platform 10 which is mounted directly on the rear chassis 3, as shown diagrammatically in FIG. 2. For example, the platform 10 may be mounted on the rear chassis 3 by four fixing devices 12 of the fast assembly/disassembly type. For example, such devices 12 may be constituted by ISO twist-lock corner members.

The platform 10 is a structure formed by an assembly of longitudinal and transverse tubular metal members 14 which are assembled together, e.g. by being welded and bolted.

A simplified embodiment of the platform 10 is shown in FIGS. 3 to 5. In general, the platform 10 extends substantially over the entire surface of the rear deck 7 of the chassis 3, and it is organized in particular for supporting a set of items of equipment, such as stowage lockers or bins, various apparatuses, and bulky spare parts which cannot be stored in the bins, all the items of equipment being supported such that access is provided to the various above-mentioned elements 5 for the purposes of performing maintenance on the engine GM of the breakdown vehicle 1.

For example there may be four stowage bins, namely two end bins 15 and 16, one central bin 17 and one side bin 18.

Bin 15 is a removable bin which is supported by a frame 20. The rigid frame 20 is fixed, it is integrated into the platform 10, and it extends transversely over the front of the rear deck 7 of the chassis 3. Bin 16 is also removable, and it is supported by a frame 22 that is hinge mounted on the platform 10. Frame 22 extends transversely over the rear portion of the rear deck 7 of the chassis 3. Bin 17 is also removable, and it is supported by a frame 24 that is hinge mounted on the platform 10. Bin 17 is situated on the central portion of the rear deck 7, and it extends parallel to the two bins 15 and 16.

Figure 6:
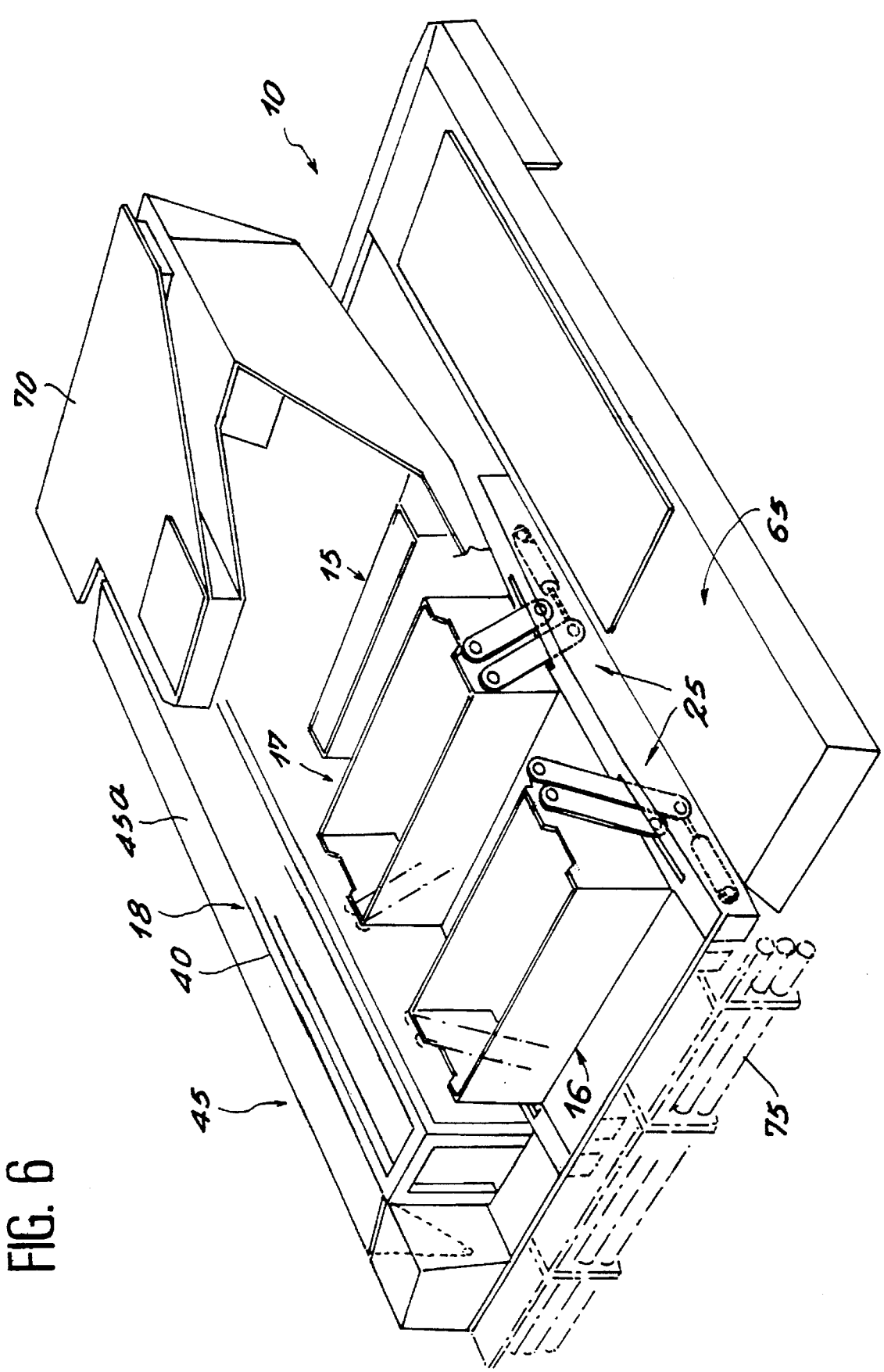
FIG. 6 is a diagrammatic perspective view of an embodiment of the platform.
Figure 7:
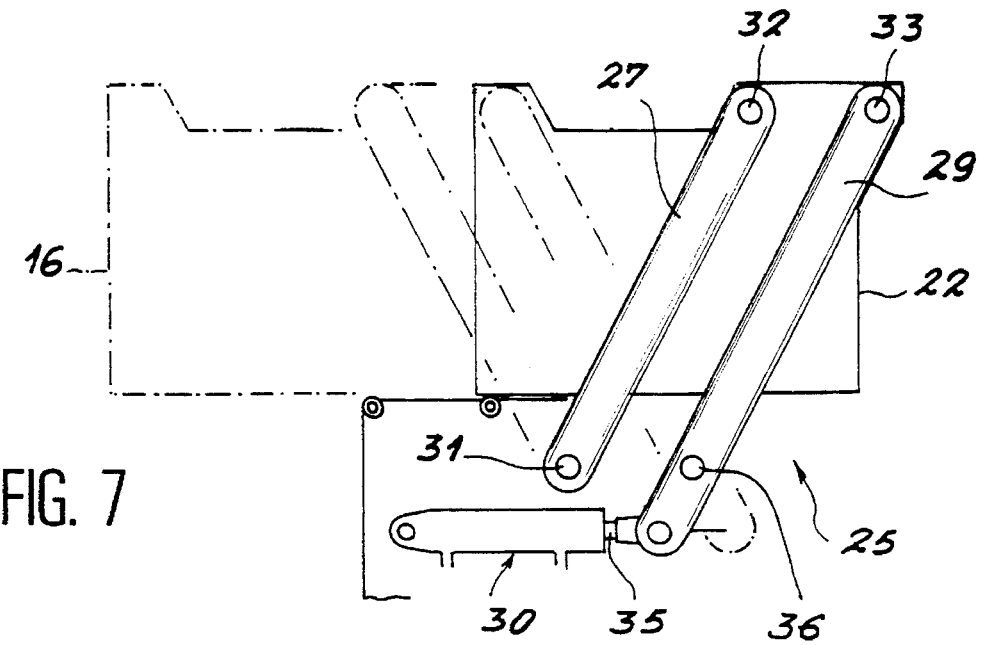
FIG. 7 is a diagram showing the pivot means for a stowage locker.

The frames 22 and 24 of bins 16 and 17 are hinged so that they can pivot between respective transport positions P1 and in-use positions P2. Each one of bins 16 and 17 pivots via two hinge devices 25 situated on respective sides of the corresponding frame 22 or 24 (not seen in FIG. 6). For example, with bin 16, each hinge device 25 comprises two links 27 and 29 and a control actuator 30, e.g. a hydraulic actuator, as shown in detail in FIG. 7. Link 27 is shown hinged at one end on a pin 31 supported by the platform 10. The other end of the link 27 is shown hinged about a pin 32 supported by frame 22. Link 29 extends parallel to link 27, and it is hinged at one end about a pin 33 supported by the frame 22 of bin 16, while its other end is hinged on the piston rod 35 of the actuator 30 whose body is fixed to the platform 10. Link 29 also pivots about a pin 36 on the platform 10. By means of the piston rod 35 travelling over a go stroke and over a return stroke, the frame 22 goes from its position P1 to its position P2 and vice-versa.

The side stowage bin 18 is supported by a fixed frame 40 integrated in the platform 10. Frame 40 extends along one side of the platform 10, and it may be divided into a plurality of unit compartments separated by transverse spacers.

A special type of longitudinal stowage locker 45 is provided along frame 40, which locker forms a border extending along the adjacent edge of the rear deck 7. A portion of locker 45 can be dropped down outwards and groundwards, as shown in FIG. 5, and in more detail in FIGS. 8 and 9.

FIG. 5 shows that locker 45 comprises a fixed portion 45a integrated in the platform 10, and a drop-down portion 45b. The fixed portion 45a comprises a bottom 46 and an inner side 47 that is adjacent to frame 40. The drop-down portion 45b comprises an outer side 48 which extends parallel to the inner side 47, and a top wall 49 which extends parallel to the bottom wall 46. The drop-down portion 45b is associated with a drop control device 50 which is shown in detail in FIGS. 8 and 9. The control device 50 comprises an actuator 52, e.g. of the hydraulic type, having its body pivotally mounted on one end of the platform 10. The piston rod 53 of actuator 52 is hinged at 54 to the drop-down portion 45b of the locker 45, the drop-down portion 45b being connected to the platform 10 via a double hinge that also enables a pivotally mounted walkway 55 to be put into service. More precisely, the drop-down portion 45b of the locker pivots about a pin 56 on a beam or a bar 57 carrying the walkway 55, and the beam or bar 57 itself pivots about a pin 58 on the platform 10. A traction spring 59 is mounted between the drop-down portion 45b and the walkway 55.

In the transport position, portion 45b is raised and the walkway 55 is housed inside the locker. When the actuator 52 is fed so as to cause the piston rod 53 to move out from the body, portion 45b and the walkway 55 pivot together about pin 58 until they reach the position shown in FIG. 9, where the beam or bar 57 abuts against the platform as shown at b. In this position, the walkway 55 is substantially horizontal.

If actuator 52 continues to be fed, the piston rod 53 causes portion 45b to pivot about pin 56, thereby stretching the spring 59.

Figure 8:
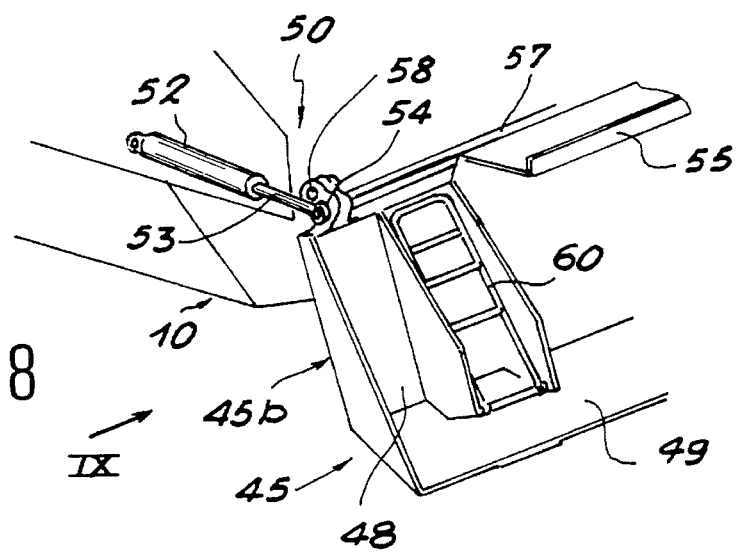
FIG. 8 is a fragmentary perspective view of an item of equipment of the platform shown in FIG. 6.
Figure 9:
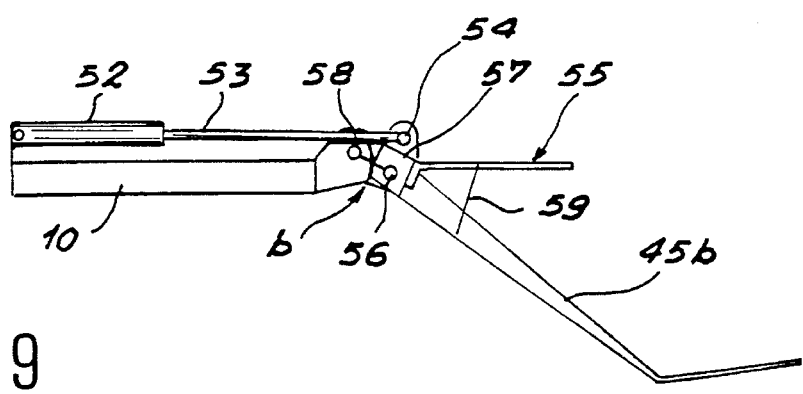
FIG. 9 is a view in the direction of arrow IX of FIG. 8.

A ladder 60 is also provided inside the drop-down portion 45b, which ladder extends between wall 49 and the walkway 55 (FIG. 8). Since it is possible that wall 49 might be above the ground when portion 45b is in the dropped-down position, as shown in FIG. 5, the ladder 60 may be mounted to pivot in the vicinity of wall 49 so as to extend between said wall and the ground.

The drop-down portion 45 may also contain tow rods which are situated man-high under the walkway 55 in the position shown in FIG. 8.

In general, the platform 10 is provided with walkways enabling personnel to move easily about the platform 10.

For example, the platform 10 may be provided with a walkway 65 on the side that is opposite from the side which supports the drop-down stowage bin 45. Advantageously, walkway 65 may be used, if necessary, for supporting apparatuses such as a hoisting crane (not shown).

The front portion of the platform 10 is raised, and its substantially planar top surface 70 may be used for supporting a bulky apparatus, such as a spare part, in particular an engine.

In general, the entire set of above-mentioned bins or lockers may be used to store tools and spare parts that are not too bulky. The modular structure of the platform 10 enables users to install their own bins as a function of the possibilities offered by the platform.

The maintenance and repair equipment of the breakdown vehicle 1 is supplemented by traction rods 75 (FIG. 6) which are supported at the rear of the platform, the rods being used to tow a vehicle.

We claim:

1. A motorized breakdown vehicle for maintenance and repair of a tank, said vehicle comprising a tank chassis on which a removable platform of modular design is mounted, the platform including supports receiving equipment required for performing maintenance, repair, and/or supply operations, a rear portion of said chassis containing an engine and receiving said platform, and at least some of the supports being displaceable on the platform so as to provide access to different portions of the engine of the vehicle.

2. A vehicle according to claim 1, wherein said equipment includes bins for stowing tools or spare parts.

3. A vehicle according to claim 2, wherein at least one stowage bins is supported by a rigid frame integrated in the platform.

4. A vehicle according to claim 2, wherein some of the stowage bins are supported by rigid frames that are hinged to the platform.

5. A vehicle according to claim 4, wherein each hinged rigid frame can be displaced by means of at least one actuator and of a set of links between a transport position and a maintenance position.

6. A vehicle according to claim 2, wherein the platform is provided with at least one stowage bin having a drop-down portion that can be dropped down groundwards along one of the sides of the chassis.

7. A vehicle according to claim 6, wherein the drop-down portion is equipped with a movable ladder.

8. A vehicle according to claim 6, wherein the stowage bin contains a pivoting walkway, said walkway being hinge mounted on the platform with said drop-down portion via a double hinge.

9. A vehicle according to claim 8, wherein said drop-down portion and the pivoting walkway can be displaced by a common actuator between transport positions and maintenance positions.

10. A vehicle according to claim 1, wherein the platform includes at least one first substantially plane zone for receiving a handling apparatus, such as a hoisting crane.

11. A vehicle according to claim 1, wherein the platform includes at least one substantially plane zone for supporting a relatively bulky spare part, such as an engine or a mechanism housing.

* * * * *